(12) United States Patent
Lauter et al.

(10) Patent No.: US 7,680,268 B2
(45) Date of Patent: Mar. 16, 2010

(54) ELLIPTIC CURVE POINT OCTUPLING USING SINGLE INSTRUCTION MULTIPLE DATA PROCESSING

(75) Inventors: Kristin E. Lauter, La Jolla, CA (US); Denis X Charles, Madison, WI (US)

(73) Assignee: Microsoft Corporation, Redmond, WA (US)

(*) Notice: Subject to any disclaimer, the term of this patent is extended or adjusted under 35 U.S.C. 154(b) by 1400 days.

(21) Appl. No.: 11/080,301

(22) Filed: Mar. 15, 2005

(65) Prior Publication Data

US 2006/0210068 A1    Sep. 21, 2006

(51) Int. Cl.
*H04L 9/00* (2006.01)
*H04L 9/28* (2006.01)
*H04K 1/00* (2006.01)

(52) U.S. Cl. .......................................... 380/28; 380/44
(58) Field of Classification Search .................. 380/28, 380/44
See application file for complete search history.

(56) References Cited

U.S. PATENT DOCUMENTS

| | | | | |
|---|---|---|---|---|
| 5,442,707 | A * | 8/1995 | Miyaji et al. | 380/30 |
| 5,577,124 | A | 11/1996 | Anshel et al. | |
| 5,751,808 | A | 5/1998 | Anshel et al. | |
| 6,212,279 | B1 * | 4/2001 | Reiter et al. | 380/278 |
| 6,252,959 | B1 * | 6/2001 | Paar et al. | 380/28 |
| 6,415,032 | B1 | 7/2002 | Doland | |
| 6,611,597 | B1 | 8/2003 | Futa et al. | |
| 7,024,559 | B1 * | 4/2006 | Solinas | 713/180 |
| 2003/0081771 | A1 | 5/2003 | Futa et al. | |
| 2003/0081785 | A1 | 5/2003 | Boneh et al. | |
| 2004/0123110 | A1 | 6/2004 | Zhang et al. | |
| 2004/0131191 | A1 | 7/2004 | Chen et al. | |
| 2004/0139029 | A1 | 7/2004 | Zhang et al. | |
| 2005/0005125 | A1 | 1/2005 | Zhang et al. | |
| 2005/0018850 | A1 | 1/2005 | Venkatesan et al. | |
| 2005/0018851 | A1 | 1/2005 | Venkatesan et al. | |
| 2005/0094806 | A1 | 5/2005 | Jao et al. | |

FOREIGN PATENT DOCUMENTS

GB    2389678 A    12/2003

OTHER PUBLICATIONS

Carter et al. "Isogenies and Duality of Abelian Varieties" Annals of Mathematics, Princeton University Press, Princeton, NJ, pp. 315-351.

Dutta et al., "Pairing-Based Cryptographic Protocols: A Survey" Cryptology Reasearch Group, Feb. 6, 2004, pp. 1-45.

Guajardo et al., "Efficient Algorithms fo Elleptic Curve Cryptosystems" Berlin, Springer, DE, Conf. 17, Aug. 17, 1997, pp. 342-356.

(Continued)

*Primary Examiner*—Benjamin E Lanier
(74) *Attorney, Agent, or Firm*—Lee & Hayes, PLLC

(57) ABSTRACT

Systems and methods for elliptic curve octupling using Single Instruction Multiple Data (SIMD) processing are described. In one aspect, a weighted projective point P on an elliptic curve, P having coordinates (x, y, z) is identified. Value 8P is computed from P with 12 sets of field multiplications using SIMD processing. Each set of field multiplications includes one to four respective field multiplications. Each set of field multiplications is performed in parallel according to an assigned time-step.

15 Claims, 3 Drawing Sheets

OTHER PUBLICATIONS

Hankerson et al. "Guide to Elliptic Curve Cryptography" Springer-Verlag, NY, pp. 75-113.

Lopez at al., "An Improvement of the Guafardo-Paar Method for Multiplication on Non-Supersingular Elliptic Curves" Nov. 9, 1998, pp. 91-95.

Hankerson, "Elliptic Curve Arithmetic", pp. 1-42.

Blake, Ian et al., "Elliptic Curves in Cryptography" Chapter IV "Efficient Implementation of Elliptic Curves" 1999, Cambridge University Press, pp. 1-25.

Sakai, Yasuyuki, et. al., "Efficient Scalar Multiplications on Elliptic Curves without Repeated Doublings and Their Practical Performance", 2000, Springer Berlin Heidelberg, pp. 1-15.

* cited by examiner

US 7,680,268 B2

ELLIPTIC CURVE POINT OCTUPLING USING SINGLE INSTRUCTION MULTIPLE DATA PROCESSING

TECHNICAL FIELD

The systems and methods of this specification relate to elliptic curve cryptography.

BACKGROUND

Cryptographic systems are concerned with confidentiality, authenticity, integrity, and non-repudiation of data sent from a first party to a second party. Modern cryptographic schemes based on the discrete logarithm problem in a finite abelian group are designed to address these concerns. One such finite abelian group is a group of points on an elliptic curve (EC) over a finite field with group operation provided by simple algebraic formulae. Such a group is becoming increasingly utilized in cryptographic systems because corresponding group operations are relatively simple to realize in hardware or software.

To fully realize implementation efficiencies using elliptic curve groups, associated field arithmetic should be carefully considered. For instance, field inversions may be significantly more processing intensive to implement as compared to multiplication operations. In such a scenario, weighted projective coordinates are typically utilized so that point addition can be performed using field multiplications, as described by Blake et al, "Elliptic Curves in Cryptography", Cambridge University Press, 1999, pages 59-60, thereby deferring field inversions, for example, until the end of a long sequence of multiplications. However, the computational cost of substantially eliminating inversions is that an increased number of multiplications are calculated. An efficient technique to multiply two elements in a finite group G is essential to performing efficient exponentiation.

Exponentiation is commonly used in public-key cryptography to calculate a scalar multiple n of points P on an elliptic curve, where n is a very large integer (e.g., a random number or private key), and wherein P is a weighted projective coordinate. An unsophisticated way to compute nP is to do n−1 operations in the group G. For cryptographic applications, the order of the group G typically exceeds $2^{160}$ elements, and may exceed $2^{2024}$ elements. Such operations are computationally intensive, and most choices of n are large enough that it becomes substantially infeasible, from the point of view of providing a responsive application, to calculate nP using n−1 successive multiplications by P. However, there are a number of techniques that can be used to reduce the computational costs of exponentiation.

For instance, repeated square-and-multiply algorithms (i.e., binary exponentiation) and windowing methods such as described by Blake et al, "Elliptic Curves in Cryptography", Cambridge University Press, 1999, pages 63-72, can reduce the computational costs of exponentiation. More particularly, repeated square-and-multiply algorithms divide the exponent n into smaller sums of powers of two (2), which respectively take less processing resources to compute. For instance, given a projective point P with coordinates (x, y, z) on an elliptic curve over a finite field, n can be divided into pieces of size $2^3$ (i.e., using a window of size 3) to calculate scalar multiples of P ($2^3$P, or 8P) with multiple point doubling iterations. To accomplish this, existing systems typically input P=(x, y, z) into the square-and-multiply algorithm to generate 2P. Next, the coordinates for 2P (output from the first doubling operation) are input as (x, y, z) into the same square-and-multiply algorithm to obtain 4P. Finally, this iterative process is repeated one more time to input the coordinates for 4P (output from the second doubling operation) as (x, y, z) into the same square-and-multiply algorithm to obtain 8P. The repeated doubling method to obtain 8P involves a total of 30 field multiplications.

SUMMARY

Systems and methods for elliptic curve octupling using Single Instruction Multiple Data (SIMD) processing are described. In one aspect, a weighted projective point P on an elliptic curve, P having coordinates (x, y, z) is identified. Value 8P is computed from P with 12 sets of field multiplications using SIMD processing. Each set of field multiplications includes one to four respective field multiplications. Each set of field multiplications is performed in parallel according to an assigned time-step.

BRIEF DESCRIPTION OF THE DRAWINGS

In the Figures, the left-most digit of a component reference number identifies the particular Figure in which the component first appears.

DETAILED DESCRIPTION

Overview

Computer processors commonly process one data element per computer instruction. This processing style is called Single Instruction Single Data (SISD). Conventional exponentiation techniques using SISD processing to calculate 8P from a point P on an elliptic curve over a finite field generally require repeated/iterative doublings involving thirty (30) field multiplications (i.e., 30 field multiplication steps) to compute 8P. Techniques to reduce the number of field multiplications (e.g., 30 field multiplications) and/or processing time to compute 8P would provide systems with improved performance. To this end, the systems and methods for elliptic curve point octupling use Single Instruction Multiple Data (SIMD) processing to calculate 8P from a point P on an elliptic curve over a finite field considerably reduce the number of field multiplications to compute 8P as compared to conventional 8P binary exponentiation implementations.

More particularly, the systems and methods implement a substantially optimized straight-line algorithm for weighted projective point octupling of a point P on an elliptic curve over a finite field. If the straight-line octupling algorithm were to be implemented solely using SISD processing, 8P of P is computed in 26 field multiplications. The straight-line octupling algorithm, however, is implemented using SIMD processing to calculate 8P from P within 12 steps of in-parallel field multiplications of maximum width of four (4). That is, SIMD processing is utilized to parallelize the multiplications in the straight-line algorithm to twelve (12) instances of up to 4 in-parallel field multiplications. For purposes of discussion, each instance of the $\leq 4$ in-parallel field multiplications is referred to as a step. Any intermediate field additions to calculate 8P are assumed to take negligible amounts of processing time. Thus, as compared to existing binary exponentiation implementations, the systems and methods for elliptic curve point octupling using SIMD processing considerably reduce the number of field multiplications and the number of multiplication steps to compute 8P from a point P on an elliptic curve over a finite field.

These and other aspects of the systems and methods for elliptic curve point octupling using SIMD processing are now described in greater detail.

An Exemplary System

Although not required, the systems and methods for elliptic curve point octupling using SIMD processing are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
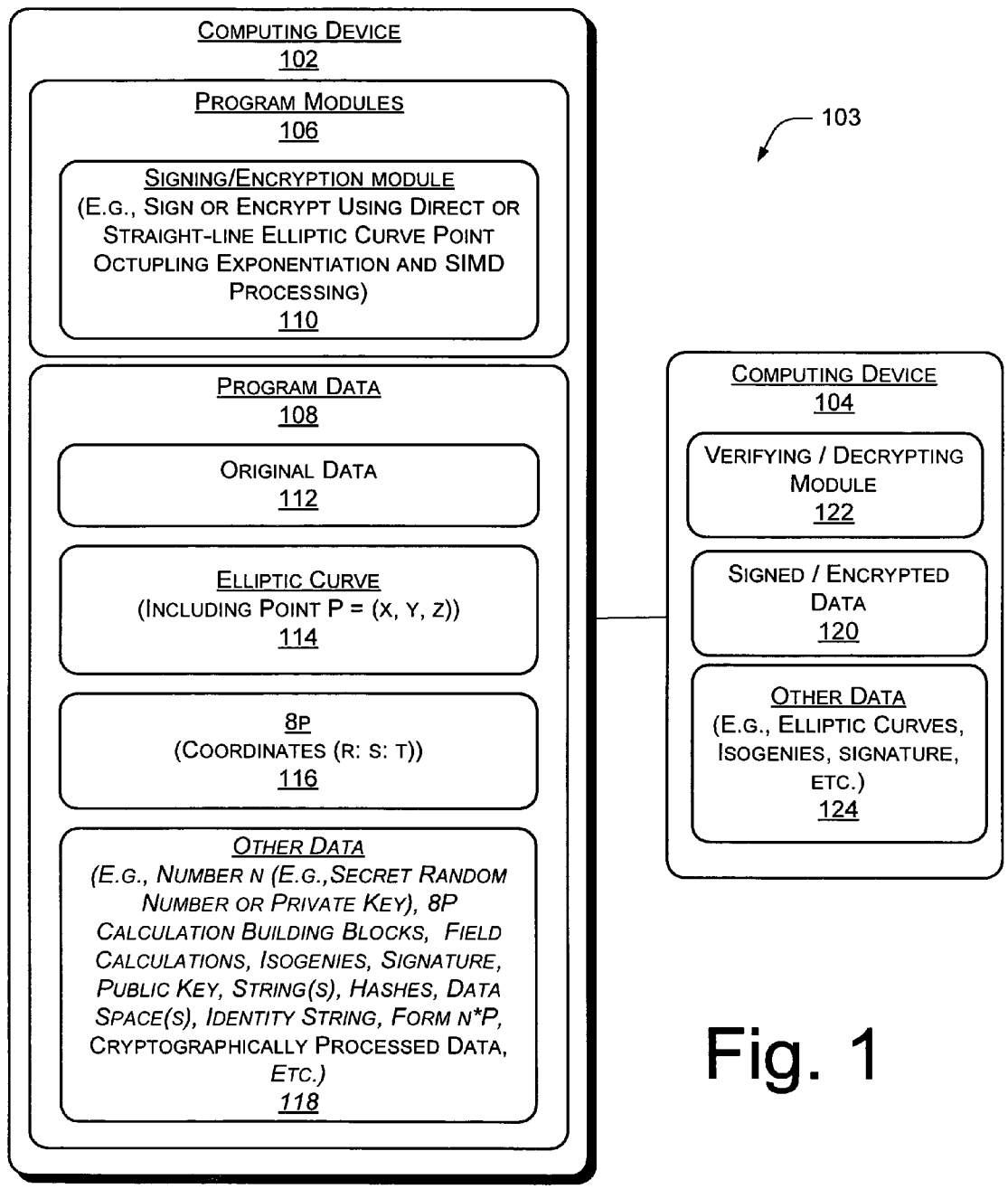
FIG. 1 illustrates an exemplary system for elliptic curve point octupling using SIMD processing.

FIG. 1 illustrates an exemplary system 100 for elliptic curve point octupling using SIMD processing. System 100 includes a first computing device 102 coupled over a communications network 103 to a second computing device 104. Communications network 103 may include any combination of a local area network (LAN) and a general wide area network (WAN) communication environments, such as those which are commonplace in offices, enterprise-wide computer networks, intranets, and the Internet. First and second computing devices 102 and 104 respectively represent any type of computing device such as a personal computer, a laptop, a server, handheld or mobile computing device (e.g., a cellular phone, personal digital assistant), and/or so on.

Computing device 102 includes program module(s) 106 and program data 108. Program modules 106 include, for example, signing/encrypting module 110 to respectively encrypt or sign original data 112 using elliptic curve (EC) point octupling exponentiation. Independent of the below described algorithms for elliptic curve point octupling, the particular cryptographic protocol implemented by signing/encrypting module 110 is arbitrary and a function of the particular cryptographic algorithm selected for implementation. To perform elliptic curve point octupling, signing/encrypting module 110 operates on a set of points on elliptic curve 114. Elliptic curve 114 conforms to the following equation: $y^2=x^3+axz^4+bz^6$ if the characteristic of the field is not equal to 2 or 3. The characteristic of the underlying field is defined to be the smallest non-zero natural number, p, such that p times any element of the field is zero.

A point P on elliptic curve 114 is represented in weighted projective form as P=(x: y: z). In one implementation, and if the cryptographic protocol implemented is a signature scheme, the point P may be a part of the public information for the cryptosystem. In another implementation, and if the cryptographic protocol implemented is a key agreement scheme (e.g., Diffie-Hellman key agreement) or an encryption scheme (e.g., ElGamal encryption), the point P may be a part of the public or private information for the cryptosystem.

TABLE 1 shows an exemplary direct elliptic curve point octupling algorithm to determine 8P (see, data component 116 of FIG. 1) from a point P on elliptic curve 114.

TABLE 1

EXEMPLARY DIRECT ALGORITHM FOR ELLIPTIC CURVE OCTUPLING OF A POINT P ON AN ELLIPTIC CURVE OVER A FINITE FIELD $$r := \left(3\left(\left(3\left((3x^2+az^4)^2-8xy^2+16ay^4z^4\right)^2 - \right.\right.\right.$$
$$8\left((3x^2+az^4)^2-8xy^2\right)\left((3x^2+az^4)(12xy^2-(3x^2+az^4)^2)-8y^4\right)^2\right)^2 +$$
$$256a\left((3x^2+az^4)(12xy^2-(3x^2+az^4)^2)-8y^4\right)^4 y^4z^4\right)^2 - 8\left((3((3x^2+az^4)^2-8xy^2)^2+16ay^4z^4\right)^2 - 8\left((3x^2+az^4)^2 - \right.$$
$$\left.8xy^2\right)\left((3x^2+az^4)(12xy^2-(3x^2+az^4)^2)-8y^4\right)^2\right)\left((3((3x^2+az^4)^2 - \right.$$
$$\left.8xy^2\right)^2+16ay^4z^4\right)\left(12((3x^2+az^4)^2-8xy^2)((3x^2+az^4)(12xy^2 - \right.$$
$$\left.(3x^2+az^4)^2)-8y^4\right)^2 - \left(3((3x^2+az^4)^2-8xy^2)^2+16ay^4z^4\right)^2\right) - $$
$$\left.8\left((3x^2+az^4)(12xy^2-(3x^2+az^4)^2)-8y^4\right)^4\right)^2$$

$$s := \left(3\left(\left(3\left((3x^2+az^4)^2-8xy^2\right)^2+16ay^4z^4\right)^2 - \right.\right.$$
$$8\left((3x^2+az^4)^2-8xy^2\right)\left((3x^2+az^4)(12xy^2-(3x^2+az^4)^2)-8y^4\right)^2\right)^2 +$$
$$256a\left((3x^2+az^4)(12xy^2-(3x^2+az^4)^2)-8y^4\right)^4 y^4z^4\right)(12((3((3x^2+az^4)^2-8xy^2)^2+16ay^4z^4)^2-8((3x^2+az^4)^2-$$
$$8xy^2)((3x^2+az^4)(12xy^2-(3x^2+az^4)^2)-8y^4)^2)((3((3x^2+az^4)^2-$$
$$8xy^2)^2+16ay^4z^4)(12((3x^2+az^4)^2-8xy^2)((3x^2+az^4)(12xy^2-$$
$$(3x^2+az^4)^2)-8y^4)^2 - (3((3x^2+az^4)^2-8xy^2)^2+16ay^4z^4)^2) - $$
$$8((3x^2+az^4)(12xy^2-(3x^2+az^4)^2)-8y^4)^4)^2 - (3((3((3x^2+az^4)^2 -$$
$$8xy^2)^2+16ay^4z^4)^2-8((3x^2+az^4)^2-8xy^2)((3x^2+az^4)(12xy^2-$$
$$(3x^2+az^4)^2)-8y^4)^2)^2 + 256a((3x^2+az^4)(12xy^2-(3x^2+az^4)^2)-$$
$$8y^4)^4 y^4z^4)^2) - 8((3((3x^2+az^4)^2-8xy^2)^2+16ay^4z^4)(12((3x^2+$$
$$az^4)^2-8xy^2)((3x^2+az^4)(12xy^2-(3x^2+az^4)^2)-8y^4)^2 -$$
$$(3((3x^2+az^4)^2-8xy^2)^2+16ay^4z^4)^2) - 8((3x^2+az^4)(12xy^2-$$
$$(3x^2+az^4)^2)-8y^4)^4)^4$$

$$t := 8((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2 -$$
$$(3((3x^2+az^4)^2-8xy^2)^2+16ay^4z^4)^2) - 8((3x^2+az^4)(12xy^2-$$
$$(3x^2+az^4)^2)-8y^4)^4)((3x^2+az^4)(12xy^2-(3x^2+az^4)^2)-8y^4)yz$$

Table 1 gives the formula for the quantity 8P=(r: s: t), where P is the point given in weighted projective coordinates (x: y: z) on the elliptic curve $y^2=x^3+axz^4+bz^6$. In contrast to conventional binary exponentiation techniques, which iteratively invoke a square-and-multiply algorithm to generate 8P from a point P on an elliptic curve over a finite field, the octupling algorithm of TABLE 1 calculates coordinates (r, s, t) of 8P independent of any iterative invocation of a square-and-multiply algorithm.

Such a direct point octupling algorithm can be used as the basic operation for an exponentiation routine using window size 3 (where the window size indicates which power of 2 is used to decompose the exponent). For example, 587*P can be calculated as 8*(8*(8*P+P)+P)+3*P instead of as 2*(2*(2*(2*(2*(2*2*2*P+P)))+P))+P)+P.

Signing/encrypting module 110 calculates 8P (116) of a point P on elliptic curve 114 of a finite field using a straight line algorithm, which is derived from the direct algorithm of TABLE 1. For purposes of discussion, a straight line formula is a process for obtaining the desired result by executing each statement in the formula in succession, much like operations are implemented by a computer, with no loops or branches to the code. TABLE 2 shows an exemplary such straight-line algorithm.

TABLE 2

EXEMPLARY STRAIGHT LINE ALGORIITHM FOR OCTUPLING OF A POINT P ON AN ELLIPTIC CURVE OVER A FINITE FIELD

```
> x2 := x^2;
x2 := x^2
> y2 := y^2;
y2 := y^2
> y4 := y2^2;
y4 := y^4
> xy2 := x*y2;
xy2 := x y^2
> yz := y*z;
yz := y z
> z2 := z^2;
z2 := z^2
> z4 := z2^2;
z4 := z^4
> az4 := a*z4;
az4 := a z^4
> ay4z4 := az4*y4;
ay4z4 := a y^4 z^4
> T1 := 3*x2 + az4;
T1 := 3 x^2 + a z^4
> T12 := T1^2;
T12 := (3 x^2 + a z^4)^2
> T2 := 12*xy2 - T12;
T2 := 12 x y^2 - (3 x^2 + a z^4)^2
> T3 := T12 - 8*xy2;
T3 := (3 x^2 + a z^4)^2 - 8 x y^2
> T32 := T3^2;
T32 := ((3 x^2 + a z^4)^2 - 8 x y^2)^2
> T4 := T1*T2 - 8*y4;
T4 := (3 x^2 + a z^4)(12 x y^2 - (3 x^2 + a z^4)^2) - 8 y^4
> T42 T4^2;
T42 := ((3 x^2 + a z^4)(12 x y^2 - (3 x^2 + a z^4)^2) - 8 y^4)^2
> T44 := T42^2;
T44 := ((3 x^2 + a z^4)(12 x y^2 - (3 x^2 + a z^4)^2) - 8 y^4)^4
> T5 := 3*T32 + 16*ay4z4;
T5 := 3 ((3 x^2 + a z^4)^2 - 8 x y^2)^2 + 16 a y^4 z^4
> T52 := T5^2;
T52 := (3 ((3 x^2 + a z^4)^2 - 8 x y^2)^2 + 16 a y^4 z^4)^2
> T6 := T44*256*ay4z4;
T6 := 256 a ((3 x^2 + a z^4)(12 x y^2 - (3 x^2 + a z^4)^2) - 8 y^4)^4 y^4 z^4
> T7 := T3*T42;
T7 := ((3 x^2 + a z^4)^2 - 8 x y^2)((3 x^2 + a z^4)(12 x y^2 - (3 x^2 + a z^4)^2) - 8 y^4)^2
> T8 := T52 - 8*T7;
```

$$T8 := \left(3\left((3x^2+az^4)^2 - 8xy^2\right)^2 + 16ay^4z^4\right)^2 - 8\left((3x^2+az^4)^2 - 8xy^2\right)\left((3x^2+az^4)(12xy^2 - (3x^2+az^4)^2) - 8y^4\right)^2$$

```
> T82 := 3*T8^2;
```

$$T8 := 3\left(\left(3\left((3x^2+az^4)^2 - 8xy^2\right)^2 + 16ay^4z^4\right)^2 - 8\left((3x^2+az^4)^2 - 8xy^2\right)\left((3x^2+az^4)(12xy^2 - (3x^2+az^4)^2) - 8y^4\right)^2\right)^2$$

```
> T9 := T82 + T6;
```

TABLE 2-continued

EXEMPLARY STRAIGHT LINE ALGORIITHM FOR OCTUPLING OF A POINT P ON AN ELLIPTIC CURVE OVER A FINITE FIELD $$T9 := 3\left(\left(3\left((3x^2+az^4)^2 - 8xy^2\right)^2 + 16ay^4z^4\right)^2 - 8\left((3x^2+az^4)^2 - 8xy^2\right)\left((3x^2+az^4)(12xy^2 - (3x^2+az^4)^2) - 8y^4\right)^2\right)^2 + 256a\left((3x^2+az^4)(12xy^2 - (3x^2+az^4)^2) - 8y^4\right)^4 y^4 z^4$$

```
> T92 := (T9)^2;
```

$$T92 := \left(3\left(\left(3\left((3x^2+az^4)^2 - 8xy^2\right)^2 + 16ay^4z^4\right)^2 - 8\left((3x^2+az^4)^2 - 8xy^2\right)\left((3x^2+az^4)(12xy^2 - (3x^2+az^4)^2) - 8y^4\right)^2\right)^2 + 256a\left((3x^2+az^4)(12xy^2 - (3x^2+az^4)^2) - 8y^4\right)^4 y^4 z^4\right)^2$$

```
> S10 := T52 - 8*T7;
```

$$S10 := \left(3\left((3x^2+az^4)^2 - 8xy^2\right)^2 + 16ay^4z^4\right)^2 - 8\left((3x^2+az^4)^2 - 8xy^2\right)\left((3x^2+az^4)(12xy^2 - (3x^2+az^4)^2) - 8y^4\right)^2$$

```
> S11 := 12*T7 - T52;
```

$$S11 := 12\left((3x^2+az^4)^2 - 8xy^2\right)\left((3x^2+az^4)(12xy^2 - (3x^2+az^4)^2) - 8y^4\right)^2 - \left(3\left((3x^2+az^4)^2 - 8xy^2\right)^2 + 16ay^4z^4\right)^2$$

```
> S12 := T5*S11;
```

$$S12 := \left(3\left((3x^2+az^4)^2 - 8xy^2\right)^2 + 16ay^4z^4\right)\left(12\left((3x^2+az^4)^2 - 8xy^2\right)(3x^2+az^4)(12xy^2 - (3x^2+az^4)^2) - 8y^4\right)^2 - \left(3\left((3x^2+az^4)^2 - 8xy^2\right)^2 + 16ay^4z^4\right)^2\right)$$

```
> S13 := S12 - 8*T44;
```

$$S13 := \left(3\left((3x^2+az^4)^2 - 8xy^2\right)^2 + 16ay^4z^4\right)\left(12\left((3x^2+az^4)^2 - 8xy^2\right)(3x^2+az^4)(12xy^2 - (3x^2+az^4)^2) - 8y^4\right)^2 - \left(3\left((3x^2+az^4)^2 - 8xy^2\right)^2 + 16ay^4z^4\right)^2\right) - 8\left((3x^2+az^4)(12xy^2 - (3x^2+az^4)^2) - 8y^4\right)^4$$

```
> S132 := S13^2;
```

$$S132 := \left(\left(3\left((3x^2+az^4)^2 - 8xy^2\right)^2 + 16ay^4z^4\right)\left(12\left((3x^2+az^4)^2 - 8xy^2\right)(3x^2+az^4)(12xy^2 - (3x^2+az^4)^2) - 8y^4\right)^2 - \left(3\left((3x^2+az^4)^2 - 8xy^2\right)^2 + 16ay^4z^4\right)^2\right) - 8\left((3x^2+az^4)(12xy^2 - (3x^2+az^4)^2) - 8y^4\right)^4\right)^2$$

TABLE 2-continued

EXEMPLARY STRAIGHT LINE ALGORIITHM FOR OCTUPLING
OF A POINT P ON AN ELLIPTIC CURVE OVER A FINITE FIELD

> S14 := S10*S132;

$$S14 := \left( \begin{array}{l}(3((3x^2+az^4)^2-8xy^2)^2+16ay^4z^4)^2-8((3x^2+az^4)^2- \\ 8xy^2)((3x^2+az^4)(12xy^2-(3x^2+az^4)^2)-8y^4)^2\end{array} \right)$$
$$((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2-$$
$$(3((3x^2+az^4)^2-8xy^2)^2+16ay^4z^4)^2)-8((3x^2+az^4)(12xy^2-$$
$$(3x^2+az^4)^2)-8y^4)^4)^2$$

> r := T92 − 8*S14;

$$r := \left(3\left((3((3x^2+az^4)^2-8xy^2)^2+16ay^4z^4\right)^2 - \right.$$
$$8((3x^2+az^4)^2-8xy^2)((3x^2+az^4)(12xy^2-(3x^2+az^4)^2)-8y^4)^2 +$$
$$256a((3x^2+az^4)(12xy^2-(3x^2+az^4)^2)-8y^4)^4 y^4z^4 - 8((3((3x^2+$$
$$az^4)^2-8xy^2)^2+16ay^4z^4)^2 - 8((3x^2+az^4)^2-$$
$$8xy^2)((3x^2+az^4)(12xy^2-(3x^2+az^4)^2)-8y^4)^2)((3((3x^2+az^4)^2-$$
$$8xy^2)^2+16ay^4z^4)(12((3x^2+az^4)^2-8xy^2)((3x^2+az^4)(12xy^2-$$
$$(3x^2+az^4)^2)-8y^4)^2 - (3((3x^2+az^4)^2-8xy^2)^2+16ay^4z^4)^2) -$$
$$\left.8((3x^2+az^4)(12xy^2-(3x^2+az^4)^2)-8y^4)^4\right)^2$$

> S15 := 12*S14 − T92;

$$S15 := 12\left((3((3x^2+az^4)^2-8xy^2)^2+16ay^4z^4)^2 - \right.$$
$$8((3x^2+az^4)^2-8xy^2)((3x^2+az^4)(12xy^2-(3x^2+az^4)^2)-8y^4)^2)$$
$$((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2 - (3((3x^2+az^4)^2-$$
$$8xy^2)^2+16ay^4z^4)^2) - 8((3x^2+az^4)(12xy^2-(3x^2+az^4)^2)-$$
$$8y^4)^4)^2 - \left(3\left((3((3x^2+az^4)^2-8xy^2)^2+16ay^4z^4\right)^2 - \right.$$
$$8((3x^2+az^4)^2-8xy^2)((3x^2+az^4)(12xy^2-(3x^2+az^4)^2)-$$
$$8y^4)^2)^2 + 256a((3x^2+az^4)(12xy^2-(3x^2+az^4)^2)-$$
$$\left.8y^4)^4 y^4z^4\right)$$

> S134 := S132^2;

$$S134 := ((3((3x^2+az^4)^2-8xy^2)^2+16ay^4z^4)(12((3x^2+az^4)^2-$$
$$8xy^2)((3x^2+az^4)(12xy^2-(3x^2+az^4)^2)-8y^4)^2 -$$
$$(3((3x^2+az^4)^2-8xy^2)^2+16ay^4z^4)^2) - 8((3x^2+az^4)(12xy^2-$$
$$(3x^2+az^4)^2)-8y^4)^4)^2$$

> s := T9*S15 − 8*S134;

TABLE 2-continued

EXEMPLARY STRAIGHT LINE ALGORIITHM FOR OCTUPLING
OF A POINT P ON AN ELLIPTIC CURVE OVER A FINITE FIELD $$s := \left(3\left((3((3x^2+az^4)^2-8xy^2)^2+16ay^4z^4\right)^2 - \right.$$
$$8((3x^2+az^4)^2-8xy^2)((3x^2+az^4)(12xy^2-(3x^2+az^4)^2)-8y^4)^2 +$$
$$256a((3x^2+az^4)(12xy^2-(3x^2+az^4)^2)-8y^4)^4 y^4z^4)(12((3((3x^2+$$
$$az^4)^2-8xy^2)^2+16ay^4z^4)^2 - 8((3x^2+az^4)^2-$$
$$8xy^2)((3x^2+az^4)(12xy^2-(3x^2+az^4)^2)-8y^4)^2)((3((3x^2+az^4)^2-$$
$$8xy^2)^2+16ay^4z^4)(12((3x^2+az^4)^2-8xy^2)((3x^2+az^4)(12xy^2-$$
$$(3x^2+az^4)^2)-8y^4)^2 - (3((3x^2+az^4)^2-8xy^2)^2+16ay^4z^4)^2) -$$
$$8((3x^2+az^4)(12xy^2-(3x^2+az^4)^2)-8y^4)^4)^2 - (3((3((3x^2+az^4)^2-$$
$$8xy^2)^2+16ay^4z^4)^2 - 8((3x^2+az^4)^2-8xy^2)((3x^2+az^4)(12xy^2-$$
$$(3x^2+az^4)^2)-8y^4)^2)^2 + 256a((3x^2+az^4)(12xy^2-(3x^2+az^4)^2)-$$
$$8y^4)^4 y^4z^4)^2) - 8((3((3x^2+az^4)^2-8xy^2)^2+16ay^4z^4)(12((3x^2+$$
$$az^4)^2-8xy^2)((3x^2+az^4)(12xy^2-(3x^2+az^4)^2)-8y^4)^2 -$$
$$(3((3x^2+az^4)^2-8xy^2)^2+16ay^4z^4)^2) - 8((3x^2+az^4)(12xy^2-$$
$$\left.(3x^2+az^4)^2)-8y^4)^4\right)^4$$

> t := 8*S13*T4*yz;

$$t := 8\left((3((3x^2+az^4)^2-8xy^2)^2+16ay^4z^4)(12((3x^2+az^4)^2- \right.$$
$$8xy^2)((3x^2+az^4)(12xy^2-(3x^2+az^4)^2)-8y^4)^2 -$$
$$(3((3x^2+az^4)^2-8xy^2)^2+16ay^4z^4)^2) - 8((3x^2+az^4)(12xy^2-$$
$$\left.(3x^2+az^4)^2)-8y^4)^4\right)((3x^2+az^4)(12xy^2-(3x^2+az^4)^2)-8y^4)yz$$

Referring to TABLE 2, equations of an exemplary straight line algorithm are preceded by a forward angle bracket and presented in bold font. Symbol ":=" means "definition", or "is defined as". For purposes of comparison to the algorithm of TABLE 1, each equation of the straight-line algorithm is presented adjacent to an execution trace (in non-bolded font) of program instructions corresponding to the equation from the algorithm of TABLE 1. As shown by TABLE 2, the straight line algorithm systematically generates building blocks, or pieces of the equations presented in TABLE 1. For purposes of exemplary illustration, such building blocks are represented with respective portions of "other data" 118. For example, the definition "xy2:=x*y2" sets xy2 equal to x*y2. Notice that later in the sequence, the term T2 leverages the definition of xy2 as T2:=12*xy2−T12, without having to recalculate x*y2, etc. In this manner, the number of field calculations needed to compute (r, s, t) of 8P of a point on an elliptic curve 114 is reduced to twenty six (26).

Each "*" symbol in an equation of TABLE 2 indicates a respective field multiplication. That is, signing/encrypting module 110 generates 12 squares and implements 14 multiplications for a total of 26 field multiplications to determine coordinates (r, s, t) of 8P (116) for point P on an elliptic curve 114. This is a significant reduction in the number of field multiplications represented by existing techniques.

TABLE 3 shows an exemplary set of time-steps for SIMD processing of the straight-line algorithm of TABLE 2.

TABLE 3

EXEMPLARY TIME-STEP FOR SIMD PROCESSING
OF THE STRAIGHT LINE PROGRAM FOR ELLIPTIC
CURVE POINT OCTUPLING

| | |
|---|---|
| x2 := x^2; | Step 1 |
| y2 := y^2; | Step 1 |
| y4 := y2^2; | Step 2 |
| xy2 := x*y2; | Step 2 |
| yz := y*z; | Step 1 |
| z2 := z^2; | Step 1 |
| z4 := z2^2; | Step 2 |
| az4 := a*z4; | Step 3 |
| ay4z4 := az4*y4; | Step 4 |
| T1 := 3*x2 + az4; | Step 4* |
| T12 := T1^2; | Step 5 |
| T2 := 12*xy2 − T12; | Step 5* |
| T3 := T12 − 8*xy2; | Step 5* |
| T32 := T3^2; | Step 6 |
| T4 := T1*T2 − 8*y4; | Step 6 |
| T42 := T4^2; | Step 7 |
| T44 := T42^2; | Step 8 |
| T5 := 3*T32 + 16*ay4z4; | Step 6* |
| T52 := T5^2; | Step 7 |
| T6 := T44*256*ay4z4; | Step 9 |
| T7 := T3*T42; | Step 8 |
| T8 := T52 − 8*T7; | Step 8* |
| T82 := 3*T8^2; | Step 9 |
| T9 := T82 + T6; | Step 9* |
| T92 := (T9)^2; | Step 10 |
| S10 := T52 − 8*T7; | Step 8* |
| S11 := 12*T7 − T52; | Step 8* |
| S12 := T5*S11; | Step 9 |
| S13 := S12 − 8*T44; | Step 9* |
| S132 := S13^2; | Step 10 |
| S14 := S10*S132; | Step 11 |
| r := T92 − 8*S14; | Step 11* |
| S15 := 12*S14 − T92; | Step 11* |
| S134 := S132^2; | Step 11 |
| s := T9*S15 − 8*S134; | Step 12 |
| t := 8*S13*T4*yz | Step 10 and Step 11 |

Referring to TABLE 3, 12 time-steps are shown, wherein each time-step identifies one or more equations to be processed in parallel. Each time-step further identifies the processing time of a set of equations relative to the processing times of equations associated with different time-steps. For example, program instructions for equations marked with time-step 1 are executed in parallel and before program instructions associated with each equation marked with time-step 2. For instance, the program instructions of lines 1, 2, 5, and 6 are performed in parallel during a first step (i.e., step 1), and before instructions associated with time-steps 2-12. Analogously, program instructions for each equation marked with time-step 2 are performed in parallel, and before program instructions associated with equations marked with time-steps 3-12, etc. For instance, program instructions of lines 3, 4, and 7 are performed in parallel during a second step (i.e., step 2), after instructions corresponding to time-step 1, and before instructions corresponding to time-steps 3-12. In this manner, the straight-line algorithm of TABLE 3 is implemented by signing/encryption module 110. (An exemplary processor implementing SIMD processing is shown and described below in reference to processor 320 of FIG. 3). Steps marked with a star denote field additions and should not be considered as field parallel multiplications.

As show in TABLE 3, the SIMD processing implementation of the straight-line algorithm results in a computation tree with a multiplication computation depth of 12 and width 4 to compute coordinates of 8P of a point P of an elliptic curve over a finite field. Specifically:

8P, X2, y2, yz, and z2 are determined in time-step 1;
y4, xy2 and z4 are determined in time-step 2;
az4 is determined in time-step 3;
ay4z4 and T1 are determined in time-step 4;
T12, T2, and T3 are determined in time-step 5;
T32, T4, and T5 are determined in time-step 6;
T42 and T52 are determined in time-step 7;
T44, T7, T8, S10, and S11 are determined in time-step 8;
T82, T9, S12, and S13 are determined in time-step 9;
T92, S132, and a first portion of t are determined in time-step 10, $t_1=8*S13*T4$;
S14, r, S15, S134, and a remaining portion of t are determined in time-step 11, $t=t_1*yz$; and
s is determined in time-step 12.

Field additions and subtractions take negligible time in comparison with a field multiplication. Steps in the algorithm of TABLES 2 and 3 that require a field addition or subtraction have been marked in TABLE 3 next to the step indication with an asterisk ("*").

Signing/encrypting module 110 cryptographically processes original data 112 using any public key-based cryptographic algorithm that has been modified to implement elliptic curve octupling exponentiation, to generate cryptographically processed data. Cryptographically processed data is shown as a respective portion of "other data" 118. Although such cryptographic processing has been described with respect to Diffie-Hellman key exchange and ElGamal encryption, signing/encrypting module 110 can employ other algorithms modified to utilize elliptic curve octupling exponentiation, to cryptographically process original data. In other words, the particular public key-based cryptographic algorithm implemented by signing/encrypting module 110, independent of the algorithm for calculating 8P of points on an elliptic curve 114 as shown above in TABLES 1 and 2, is arbitrary because it is a function of the particular cryptographic algorithm selected for implementation.

For example, respective implementations of signing/encrypting module 110 implement one or more of the following cryptographic protocols: identity-based cryptography (e.g., plain, blind, proxy, ring, undeniable, etc.), encryption protocols (e.g., authenticated, broadcast, encryption with keyword search, etc.), batch signatures, key agreement (plain, authenticated, group, etc.), trust authorities and public key certification, hierarchical cryptosystems, threshold cryptosystems and signatures, chameleon hash and signatures, authentication, applications and systems, access control, key agreement, non-interactive key distribution, credentials (e.g., anonymous, hidden, self-blindable, etc.), secret handshakes, provably secure signatures, short signatures, aggregate, ring, and verifiably encrypted signatures, blind and partially blind signatures, proxy signatures, undeniable signatures, signcryption, multi-signatures and threshold signatures, limited-verifier and designated-verifier signatures, threshold cryptosystems, hierarchical and role-based cryptosystems, chameleon hash and signatures, verifiable random functions, strongly insulated encryption, intrusion-resilient encryption, certificate-less PKC, al, traitor tracing, and/or so on.

In one implementation, device 102 communicates cryptographically processed data to device 104 for verifying/decrypting. For purposes of exemplary illustration, cryptographically processed data received by device 104 is shown as signed/encrypted data 120. Computing device 104 includes verifying/decrypting module 122 to verify or decrypt the received cryptographically processed data. In one scenario, verifying/decrypting module 118 verifies as cryptographically processed data when the cryptographically processed data has been cryptographically signed. In this scenario, verifying/decrypting module 118 utilizes one or more implementations of the elliptic curve point octupling exponentiation described above to verify the cryptographically processed data. In another scenario, verifying/decrypting module 116 decrypts cryptographically processed data that has been encrypted. In this scenario, verifying/decrypting module 118 utilizes one or more implementations of the elliptic curve point octupling exponentiation described above to decrypt the cryptographically processed data.

Exemplary Elliptic Curve Point Octupling Using SIMD Processing

Figure 2:
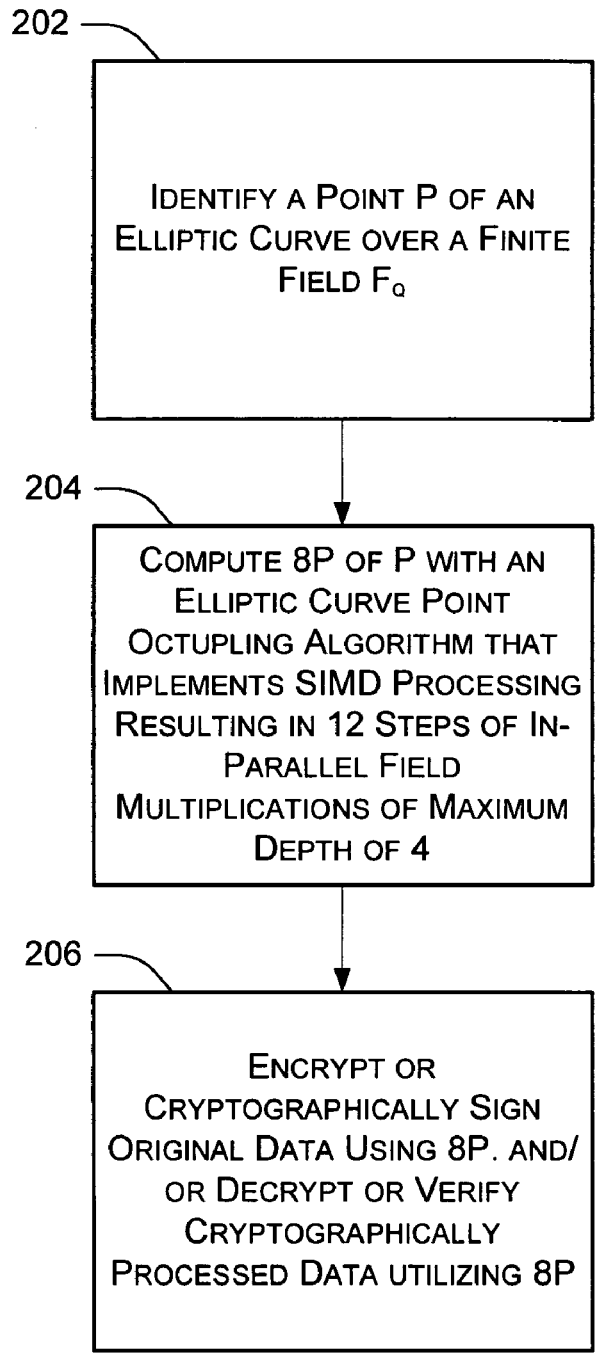
FIG. 2 shows an exemplary procedure for elliptic curve point octupling using SIMD processing.

FIG. 2 shows an exemplary procedure 200 to for elliptic curve point octupling using SIMD processing. For purposes of discussion and exemplary illustration, the operations of procedure 200 are described with respect to components of FIG. 1. To this end, the left-most digit of a component reference number identifies the particular figure in which the component first appears. At block 202, signing/encrypting module 110 (FIG. 1) identifies a point P of an elliptic curve 114 over a finite field $F_q$. Point P has weighted projective coordinates of (x, y, z). At block 202, signing/encrypting module 110 computes 8P of P independent of repeated doubling operations. 8P has coordinates (r, s, t). In one implementation, 8P is computed using a straight-line elliptic curve point octupling algorithm of TABLE 3. This is accomplished using SIMD processing. As a result, 8P is computed with 12 in-parallel field multiplications of maximum depth of 4 (i.e., one to 4 multiplication operations being performed in parallel as a function of corresponding time-steps). At block 206, results of the elliptic curve point octupling algorithm are utilized to encrypt or cryptographically sign original data, or decrypt or verify cryptographically processed data.

An Exemplary Operating Environment

Figure 3:
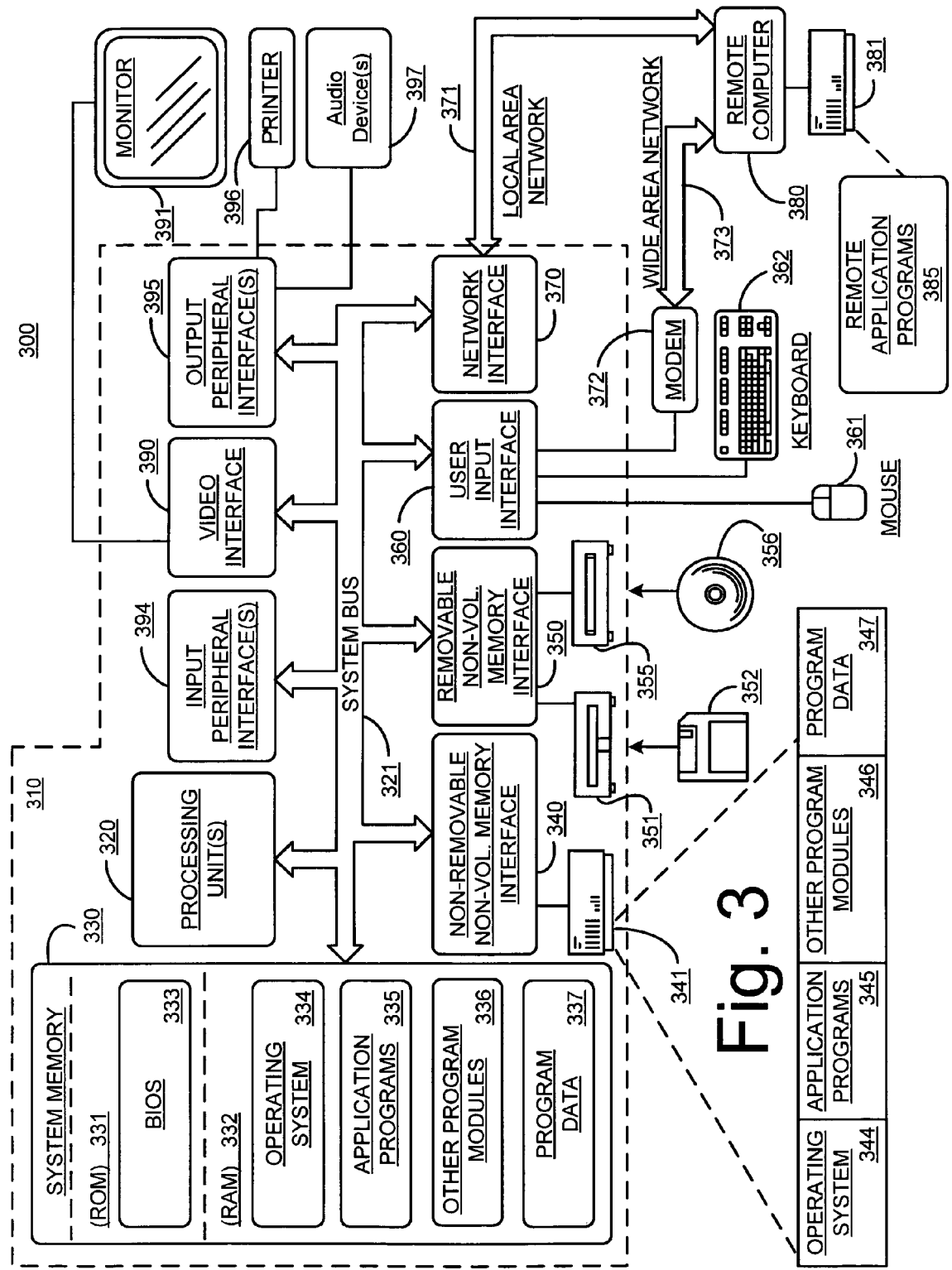
FIG. 3 illustrates an example of a suitable computing environment for fully or partially implementing the systems and methods for elliptic curve point octupling using SIMD processing.

FIG. 3 illustrates an example of a suitable computing environment in which elliptic curve octupling using SIMD processing may be fully or partially implemented. Exemplary computing environment 300 is only one example of a suitable computing environment for the exemplary system of FIG. 1 and exemplary operations of FIG. 2, and is not intended to suggest any limitation as to the scope of use or functionality of systems and methods the described herein. Neither should computing environment 300 be interpreted as having any dependency or requirement relating to any one or combination of components illustrated in computing environment 300.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a distributed computing environment where tasks are performed by remote processing devices that are linked through a communications network. In a distributed computing environment, program modules may be located in both local and remote memory storage devices.

With reference to FIG. 3, an exemplary system elliptic curve octupling using SIMD processing includes a general purpose computing device in the form of a computer 310 implementing, for example, system 100 of FIG. 1. The following described aspects of computer 310 are exemplary implementations of computing devices 102 and/or 104 of FIG. 1. Components of computer 310 may include, but are not limited to, processing unit(s) 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 310 typically includes a variety of computer-readable media. Computer-readable media can be any available media that can be accessed by computer 310 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 310.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320, which implements SIMD processing. In one implementation, processor 320 features a set of SIMD instructions that support 64-bit floating-point values (e.g., an SIMD Extension (SSE) Extensions (SSE2) architecture). By way of example and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Application programs 335 includes, for example program modules of computing devices 102 or 104 of FIG. 1. Program data 337 includes, for example, program data of computing devices 102 or 104 of FIG. 1. Operating system 344, application programs 345, other program modules 346, and program data 347 are given different numbers here to illustrate that they are at least different copies.

A user may enter commands and information into the computer 310 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB).

A monitor 391 or other type of display device is also connected to the system bus 321 via an interface, such as a video interface 390. In addition to the monitor, computers may also include other peripheral output devices such as printer 396 and audio device(s) 397, which may be connected through an output peripheral interface 395.

The computer 310 operates in a networked environment using logical connections to one or more remote computers, such as a remote computer 380. In one implementation, remote computer 380 represents computing device 102 or networked computer 104 of FIG. 1. The remote computer 380 may be a personal computer, a server, a router, a network PC, a peer device or other common network node, and as a function of its particular implementation, may include many or all of the elements described above relative to the computer 310, although only a memory storage device 381 has been illustrated in FIG. 3. The logical connections depicted in FIG. 3 include a local area network (LAN) 381 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example and not limitation, FIG. 3 illustrates remote application programs 385 as residing on memory device 381. The network connections shown are exemplary and other means of establishing a communications link between the computers may be used.

CONCLUSION

Although the systems and methods for elliptic curve octupling using SIMD processing have been described in language specific to structural features and/or methodological operations or actions, it is understood that the implementations defined in the appended claims are not necessarily limited to the specific features or actions described. For example, although signing/encryption module 110 (FIG. 1) and verifying/decrypting module 122 (FIG. 1) are shown on different respective computing devices (i.e., devices 102 and 104), in another implementation, logic associated with these program modules can be implemented on a single computing device 102. Accordingly, the specific features and operations of system 100 are disclosed as exemplary forms of implementing the claimed subject matter.

The invention claimed is:

1. A method implemented by a single instruction multiple data (SIMD) computing system, the method comprising:
    Identifying, by a SIMD computing system configured to perform elliptic-curve octupling using SIMD, the coordinates x, y, and z of a weighted projective point P on an elliptic curve;
    computing by the SIMD computing system the coordinates r, s, t for 8P from P, 8P comprising 12 sets of field multiplications, the set of field multiplications comprising one to four particular field multiplications, each particular set of the 12 sets of field multiplications executed by the SIMD computing devices in parallel according to an assigned time-step, wherein computing 8P is determined with a straight-line algorithm;
    initially receiving original data;
    determining 8P for respective points on the elliptic curve with the straight-line elliptic curve point octupling algorithm;
    encrypting or signing the original data based upon the results of the determining of 8P; and
    storing the coordinates r, s, t to a computer readable storage medium associated with the computing system for subsequent use by the computing system.

2. A method as recited in claim 1 further comprising, calculating repeated doubling operations by the SIMD computing system independently from the computing of 8P.

3. A method as recited in claim 1, wherein the 12 sets of field multiplications are provided with a straight-line elliptic curve point octupling algorithm comprising the following, wherein the symbol :=represents a define operation:
    $x2:=x\hat{\ }2$;
    $y2:=y\hat{\ }2$;
    $y4:=y2\hat{\ }2$;
    $xy2:=x*y2$;
    $yz:=y*z$;
    $z2:=z\hat{\ }2$;
    $z4:=z2\hat{\ }2$;
    $az4:=a*z4$;

ay4z4:=az4*y4;
T1:=3*x2+az4;
T12:=T1^2;
T2:=12*xy2−T12;
T3:=T12−8*xy2;
T32:=T3^2;
T4:=T1*T2−8*y4;
T42:=T4^2;
T44:=T42^2;
T5:=3*T32+16*ay4z4;
T52:=T5^2;
T6:=T44*256*ay4z4;
T7:=T3*T42;
T8:=T52−8*T7;
T82:=3*T8^2;
T9:=T82+T6;
T92:=(T9)^2;
S10:=T52−8*T7;
S11:=12*T7−T52;
S12:=T5*S11;
S13:=S12−8*T44;
S132:=S13^2;
S14:=S10*S132;
r:=T92−8*S14;
S15:=12*S14−T92;
S134:=S132^2;
s:=T9*S15−8*S134; and
t:=8*S13*T4*yz.

4. A method as recited in claim 3, wherein each set of the 12 sets of field multiplications are performed in a respective step by implementing the calculation of multiple values within particular time-steps, the calculations within each time-step being calculated in parallel, each particular step comprising:
8P, X2, y2, yz, and z2 in time-step 1;
y4, xy2, and z4 in time-step 2;
az4 in time-step 3;
ay4z4 and T1 in time-step 4;
T12, T2, and T3 in time-step 5;
T32, T4, and T5 in time-step 6;
T42 and T52 in time-step 7;
T44, T7, T8, S10, and S11 in time-step 8;
T82, T9, S12, and S13 in time-step 9;
T92, S132, and a first portion of t in time-step 10;
S14, r, S15, S134, a remaining portion of t in time-step 11; and
s in time-step 12.

5. A computer-readable storage medium comprising computer-program instructions executable by a processor for:
identifying coordinates (x, y, z) corresponding to a weighted projective point P on an elliptic curve; and
determining coordinates (r, s, t) associated with 8P by calculating 8P of P with 12 sets of field multiplications, each respective set of field multiplications comprising one to four field multiplications, each respective set of field multiplications being performed in parallel according to an assigned time-step, wherein the computer-program instructions for computing 8P are determined with a straight-line algorithm;
receiving original data;
determining 8P for respective points on the elliptic curve with the straight-line elliptic curve point octupling algorithm;
decrypting or verifying cryptographically processed data based on results of the determining; and
storing the coordinates r, s, t to a computer readable storage medium associated with the computing system for subsequent use by the computing system.

6. A computer-readable storage medium as recited in claim 5, the computer-program instructions further comprising instructions for the processor for computing repeated doubling operations independently from the computing of 8P.

7. A computer-readable storage medium as recited in claim 5, wherein the 12 sets of field multiplications are provided with a straight-line elliptic curve point octupling algorithm, which if not implemented with SIMD processing, would result in 26 field multiplications to calculate 8P.

8. A computer-readable storage medium as recited in claim 7, wherein symbol :=represents a define operation, and wherein the straight-line elliptic curve point octupling algorithm comprises the following:
x2:=x^2;
y2:=y^2;
y4:=y2^2;
xy2:=x*y2;
yz:=y*z;
z2:=z^2;
z4:=z2^2;
az4:=a*z4;
ay4z4:=az4*y4;
T1:=3\*x2+az4;
T12:=T1^2;
T2:=12*xy2−T12;
T3:=T12−8*xy2;
T32:=T3^2;
T4:=T1*T2−8*y4;
T42:=T4^2;
T44:=T42^2;
T5:=3*T32+16*ay4z4;
T52:=T5^2;
T6:=T44*256*ay4z4;
T7:=T3*T42;
T8:=T52−8*T7;
T82:=3*T8^2;
T9:=T82+T6;
T92:=(T9)^2;
S10:=T52−8*T7;
S11:=12*T7−T52;
S12:=T5*S11;
S13:=S12−8*T44;
S132:=S13^2;
S14:=S10*S132;
r:=T92−8*S14;
S15:=12*S14−T92;
S134:=S132^2;
s:=T9*S15−8*S134; and
t:=8*S13*T4*yz.

9. A computer-readable storage medium as recited in claim 8, wherein the computer-program instructions for computing 8P, each set of the 12 sets of field multiplications are executed in a respective step by implementing the calculation of multiple values within particular time-steps, the calculations within each time-step being calculated in parallel, each particular step comprising:
8P, X2, y2, yz, and z2 in time-step 1;
y4, xy2, and z4 in time-step 2;
az4 in time-step 3;
ay4z4 and T1 in time-step 4;
T12, T2, and T3 in time-step 5;
T32, T4, and T5 in time-step 6;
T42 and T52 in time-step 7;
T44, T7, T8, S10, and S11 in time-step 8;
T82, T9, S12, and S13 in time-step 9;

T92, S132, and a first portion of t in time-step 10;
S14, r, S15, S134, a remaining portion of t in time-step 11; and
s in time-step 12.

10. A computing device comprising:
a processor configured to support at least in part Single Input Multiple Data processing; and
a memory coupled to the processor, the memory comprising computer-program instructions executable by the processor for:
identifying coordinates (x, y, z) corresponding to a weighted projective point P on an elliptic curve; and
determining coordinates (r, s, t) corresponding to the result of computing 8P of P with 12 sets of field multiplications, each respective set of field multiplications comprising one to four field multiplications, each respective set of field multiplications being performed in parallel by separate processes of the computing device according to an assigned time-step, wherein the computer-program instructions for computing 8P are determined with a straight-line algorithm;
receiving original data;
determining 8P for respective points on the elliptic curve with the straight-line elliptic curve point octupling algorithm;
encrypting or signing original data based on results of the determining; and
storing the coordinates r, s, & t to a computer readable storage medium associated with the computing system for subsequent use by the computing system.

11. A computing device as recited in claim 10, wherein the 12 sets of field multiplications are provided with a straight-line elliptic curve point octupling algorithm comprising;
x2:=x^2;
y2:=y^2;
y4:=y2^2;
xy2:=x*y2;
yz :=y*z;
z2:=z^2;
z4:=z2^2;
az4:=a*z4;
ay4z4:=az4*y4;
T1:=3*x2+az4;
T12:=T1^2;
T2:=12*xy2−T12;
T3:=T12−8*xy2;
T32:=T3^2;
T4:=T1*T2−8*y4;
T42:=T4^2;
T44:=T42^2;
T5:=3*T32+16*ay4z4;
T52:=T5^2;
T6:=T44*256*ay4z4;
T7:=T3*T42;
T8:=T52−8*T7;
T82:=3*T8^2;
T9:=T82+T6;
T92:=(T9)^2;
S10:=T52−8*T7;
S11:=12*T7−T52;
S12:=T5*S11;
S13:=S12−8*T44;
S132:=S13^2;
S14:=S10*S132;
r:=T92−8*S14;
S15:=12*S14−T92;
S134:=S132^2;

s:=T9*S15−8*S134; and
t:=8*S13*T4*yz,
wherein symbol :=represents a define operation.

12. A computing device as recited in claim 11, wherein the computer-program instructions for computing 8P, each set of the 12 sets of field multiplications are executed in a respective step by implementing the calculation of multiple values within particular time-steps, the calculations within each time-step being calculated in parallel, each particular step comprising:
8P, X2, y2, yz, and z2 in time-step 1;
y4, xy2, and z4 in time-step 2;
az4 in time-step 3;
ay4z4 and T1 in time-step 4;
T12, T2, and T3 in time-step 5;
T32, T4, and T5 in time-step 6;
T42 and T52 in time-step 7;
T44, T7, T8, S10, and S11 in time-step 8;
T82, T9, S12, and S13 in time-step 9;
T92, S132, and a first portion of t in time-step 10;
S14, r, S15, S134, a remaining portion of t in time-step 11; and
s in time-step 12.

13. A method implemented by a single instruction multiple data (SIMD) computing system, the method comprising:
identifying, by a SIMD computing system configured to perform elliptic-curve octupling using SIMD, the coordinates x, y, and z of a weighted projective point P on an elliptic curve; and
computing by the SIMD computing system the coordinates r, s, t for 8P from P, 8P comprising 12 sets of field multiplications, the set of field multiplications comprising one to four particular field multiplications, each particular set of the 12 sets of field multiplications executed by the SIMD computing devices in parallel according to an assigned time-step, wherein computing 8P is determined with a straight-line algorithm;
initially receiving original data;
determining 8P for respective points on the elliptic curve with the straight-line elliptic curve point octupling algorithm;
decrypting or verifying cryptographically processed the original data based on results of the determining of 8P; and
storing the coordinates r, s, t to a computer readable storage medium associated with the computing system for subsequent use by the computing system.

14. A computer-readable storage medium comprising computer-program instructions executable by a processor for:
identifying coordinates (x, y, z) corresponding to a weighted projective point P on an elliptic curve; and
determining coordinates (r, s, t) associated with 8P by calculating 8P of P with 12 sets of field multiplications, each respective set of field multiplications comprising one to four field multiplications, each respective set of field multiplications being performed in parallel according to an assigned time-step, wherein the computer-program instructions for computing 8P are determined with a straight-line algorithm;
receiving original data;
determining 8P for respective points on the elliptic curve with the straight-line elliptic curve point octupling algorithm;
encrypting or signing original data based on results of the determining; and storing the coordinates r, s, t to a computer readable storage medium associated with the computing system for subsequent use by the computing system.

15. A computing device comprising:
a processor configured to support at least in part Single Input Multiple Data processing; and
a memory coupled to the processor, the memory comprising computer-program instructions executable by the processor for:
identifying coordinates (x, y, z) corresponding to a weighted projective point P on an elliptic curve; and
determining coordinates (r, s, t) corresponding to the result of computing 8P of P with 12 sets of field multiplications, each respective set of field multiplications comprising one to four field multiplications, each respective set of field multiplications being performed in parallel by separate processes of the computing device according to an assigned time-step, wherein computing 8P is determined with a straight-line algorithm;
receiving original data;
determining 8P for respective points on the elliptic curve with the straight-line elliptic curve point octupling algorithm;
decrypting or verifying cryptographically processed data based on results of the determining; and
storing the coordinates r, s, & t to a computer readable storage medium associated with the computing system for subsequent use by the computing system.

* * * * *